United States Patent

Li et al.

[11] Patent Number: 5,872,347
[45] Date of Patent: Feb. 16, 1999

[54] METHOD AND DEVICE FOR CONTROLLING DISCHARGING CURRENT SLOPE OF WIRE CUT ELECTRICAL DISCHARGE MACHINE

[75] Inventors: Hsi-Pin Li, Hsinchu; Jui-Fang Liang, Fu Shing Jan Hua; Cheng-Fu Tsai, Tai Chung, all of Taiwan

[73] Assignee: Industrial Technology Research Institute, Hsinchu, Taiwan

[21] Appl. No.: 881,685

[22] Filed: Jun. 24, 1997

[51] Int. Cl.[6] .............................. B23H 1/00; B23H 7/04; B23H 7/16
[52] U.S. Cl. .................................. 219/69.12; 219/69.13; 219/69.19
[58] Field of Search ............................. 219/69.12, 69.13, 219/69.18, 69.19

[56] References Cited

U.S. PATENT DOCUMENTS

| | | | |
|---|---|---|---|
| 4,376,880 | 3/1983 | Inoue | 219/69.13 |
| 4,767,905 | 8/1988 | Inoue | 219/69.13 |
| 4,800,248 | 1/1989 | Futamura et al. | 219/69.18 |
| 4,967,054 | 10/1990 | Obara et al. | 219/69.13 |
| 5,187,341 | 2/1993 | Graell | 219/69.18 |

FOREIGN PATENT DOCUMENTS

| | | | |
|---|---|---|---|
| 61-293718 | 12/1986 | Japan | 219/69.19 |
| 3-35940 | 2/1991 | Japan | 219/69.19 |

Primary Examiner—Geoffrey S. Evans
Attorney, Agent, or Firm—W. Wayne Liauh

[57] ABSTRACT

It is a main object of the present invention to improve the drawback of a conventional wire cut EDM which controls the pulse width of discharging current to supply discharge energy under the state of constant current slope. The discharging current slope control method and device of the wire cut electrical discharge machine of the present invention comprises an electrical discharge detecting circuit, a timing controller circuit, a normal discharge driver circuit, an arc discharge driver circuit, normal discharge switch elements and arc discharge switch elements. The slopes of the output triangle waveform currents shall be variable due to the different results of detecting by the electrical discharge detecting circuit, depending on normal discharge or arc discharge condition, to render the current slope of the arc discharge smaller than the current slope of the normal discharge, so as to achieve the effect of keeping a high machining speed without easily breaking of the wire electrode.

9 Claims, 4 Drawing Sheets

METHOD AND DEVICE FOR CONTROLLING DISCHARGING CURRENT SLOPE OF WIRE CUT ELECTRICAL DISCHARGE MACHINE

BACKGROUND OF THE INVENTION

1. Field of the Invention

The present invention relates to a wire cut electrical discharge machine(EDM). More particularly, it relates to a method and device for controlling discharge the current slope of wire cut electrical discharge machine.

2. Description of the Prior Art

Referring to FIG. 1, conventional wire cut electrical discharge machine(EDM) as disclosed in Taiwan Utility Model Patent Publication No. 82108873, as shown in FIG. 1, comprises a power source 1, a capacitor 2, electrode wires 3 including lines L1~Ln combined with point "a" line of a loop circuit, a wire electrode 4 of the wire cut EDM and a workpiece 5. To maintain a stable electrical discharge state, the wire cut EDM controls the discharging conditions by sending the voltage condition of discharge gap 6 to an electrical discharge detecting circuit 7 to judge whether it is in one of the normal discharge or the arc discharge conditions, then deciding the pulse width of discharging duration through a timing controller circuit 8, driving a set of switches 10 by a driver circuit 9 which receives the output of the timing controller circuit 8 to control the turn-on time of SW-1~SW-n of switches 10 respectively so that the pulse width of the normal discharge is twice that of the arc discharge. The main discharge loop circuit of the conventional wire cut EDM has no current-limited resistor, and its machining current slope which is constant after finishing configuration is determined by the inductance of the electrode wire 3. A large machining current slope will obtain a faster machining rate and therefore can be more efficient, but it is more possible to cause wire electrode breakage is excess current peak and current density of arc discharge arc provided. The method of detecting electrical discharge of the conventional wire cut EDM is to provide a detecting voltage between the wire electrode 4 and the workpiece 5, and checking the gap voltage between the wire electrode 4 and the workpiece 5 alter a period of time to see whether the gap voltage is larger than a predetermined reference voltage or not. If the gap voltage is larger than the reference voltage, it means there is a proper gap between the wire electrode 4 and the workpiece 5, so that it will be deemed as normal discharge when it discharges next time. Otherwise, if the detected voltage is smaller than the reference voltage, it means that the distance between the wire electrode 4 and the workpiece 5 (gap) is too small, and it would be deemed as are discharge next time.

The wire cut electrical discharge machine(EDM) as above-mentioned judges first, whether the electrical discharge (of next time is normal discharge or, arc discharge by electrical discharge detecting circuit 7 alter initiating machining, then controls the driver circuit 9, by the timing signals produced by the discharge timing controller circuit 8 to control the turn-on of the set of switches 10 SW-1~SW-n for pulse width modulation, making the pulse width of normal discharge to be twice that of the arc discharge, so as to obtain a differert discharging energy for maintaining a stable machining. The discharging current signal waveform at point "a" of the circuitry is shown in FIG. 2, wherein T1 is the half cycle pulse width controlled by normal discharge and T2 is the half cycle pulse width controlled by arc discharge; the slopses of both discharge states are the same, S1; the provided energy ratio of normal discharge and arc discharge equals $(T1/T2)^2$, the energy variance during electrical discharge, therefore, is nonlinear and the wire electrode 4 breakage occurs easily due to the same large discharging slope of normal discharge and arc discharge, affecting the machining quality and speed.

SUMMARY OF THE INVENTION

The present invention has been accomplished to solve the above problems. The objects of the present invention are to offer a method and device for controlling a wire cut EDM wherein two sets of switching elements corresponding to different inductance of electrode wires are controlled respectively for adjusting the slope of discharging current, so that the wire cut EDM maintains a large current slope in normal discharge condition to promote the machining speed of wire cut EDM and a small current slope in arc discharge to prevent the wire electrode from breakage.

The controlling discharge current slope method of the wire cut EDM of the present invention comprises following steps of: (a) applying a detecting voltage between the wire electrode and the workpiece by a discharging detecting circuit to predict whether it will be normal discharge or arc discharge next time; (b) determining the discharging periods of normal discharge or arc discharge based on the result of predicted discharging condition, and maintaining a large discharging current slope in normal discharge and a small discharging current slope in arc discharge by adjusting the discharging current slope; (c) during normal discharge duration, driving the normal discharge switching elements to send the discharging energy between the wire electrode and the workpiece through the normal discharge electrode wires; (d) during arc discharge duration, driving the arc discharge switching elements to send the discharging energy between the wire electrodes and the workpiece through the arc discharge electrode wires.

The controlling discharging current slope device of the wire cut EDM of the present invention comprises: an electrical discharge detecting circuit for detecting and judging whether it will be in a normal discharge or an arc discharge condition prior to sending out the discharging current; a timing controlling circuit for controlling different timing based on the detected result of normal discharge or arc discharge detected by the electrical discharge detecting circuit; a normal discharge driver circuit for amplifying and sending the normal discharge timing control signal from the timing controlling circuit; an arc discharge driver circuit for amplifying and sending the arc discharge timing control signal from the timing controlling circuit; normal discharge switch elements for selectively turning on as receiving the amplified timing controlling signal from the normal discharge driver circuit to control the discharging duration of the wire cut EDM; arc discharge switch elements for selectively turning on as receiving the amplified timing controlling signal from the arc discharge driver circuit to control the discharging duration of the wire cut EDM. The function condition is as follows: the normal discharge switch elements and the arc discharge switch elements are switched between electrode wire circuits having different inductance to adjust the discharging current slope, so as to maintain a larger current slope in normal discharge condition and to maintain a small current slope in arc discharge conditions.

DETAILED DESCRIPTION OF THE PREFERRED EMBODIMENT

Figure 1:
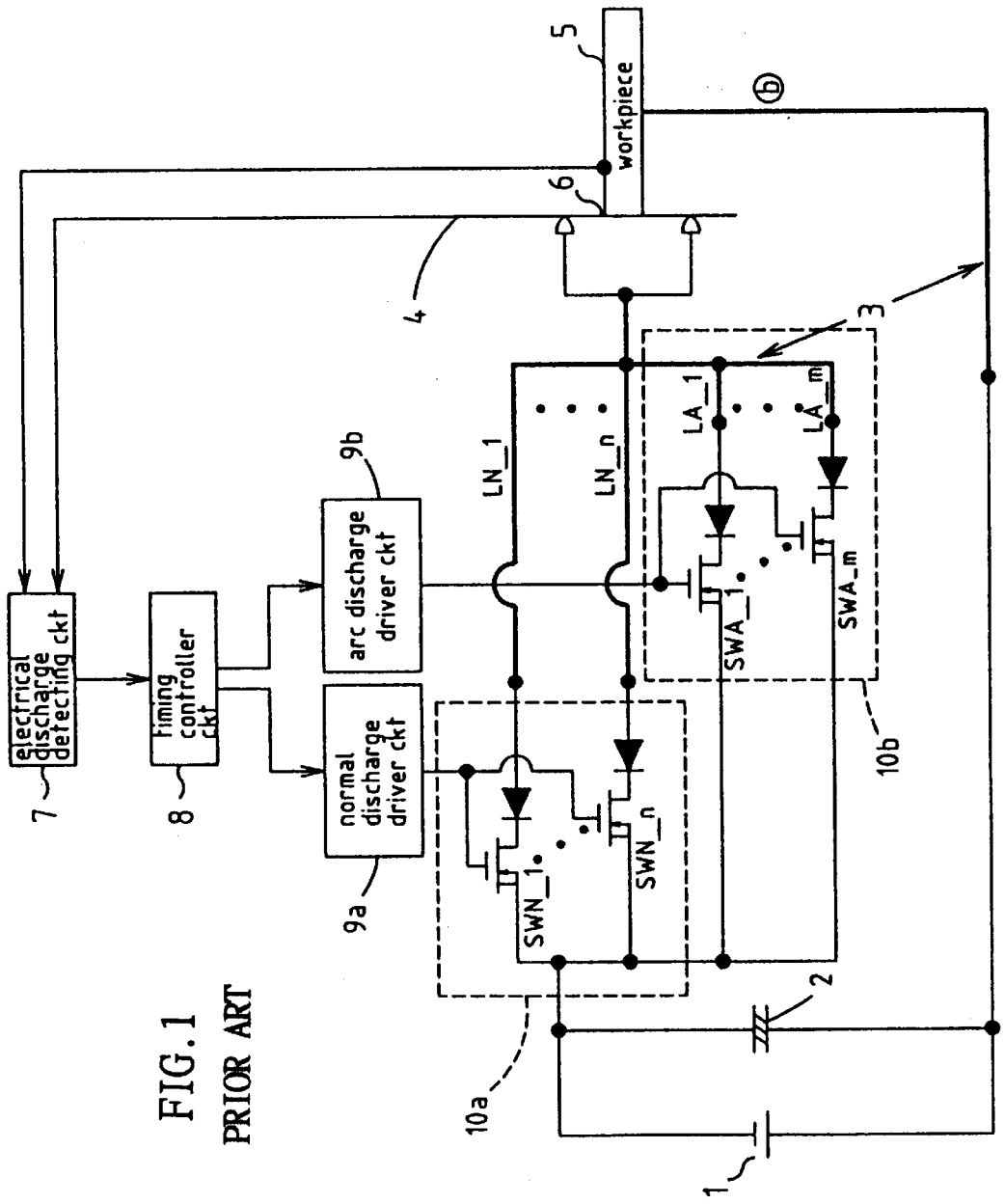
FIG. 1 is a schematic diagram if a discharge circuitry of wire cut EDM according to prior art.
Figure 2:
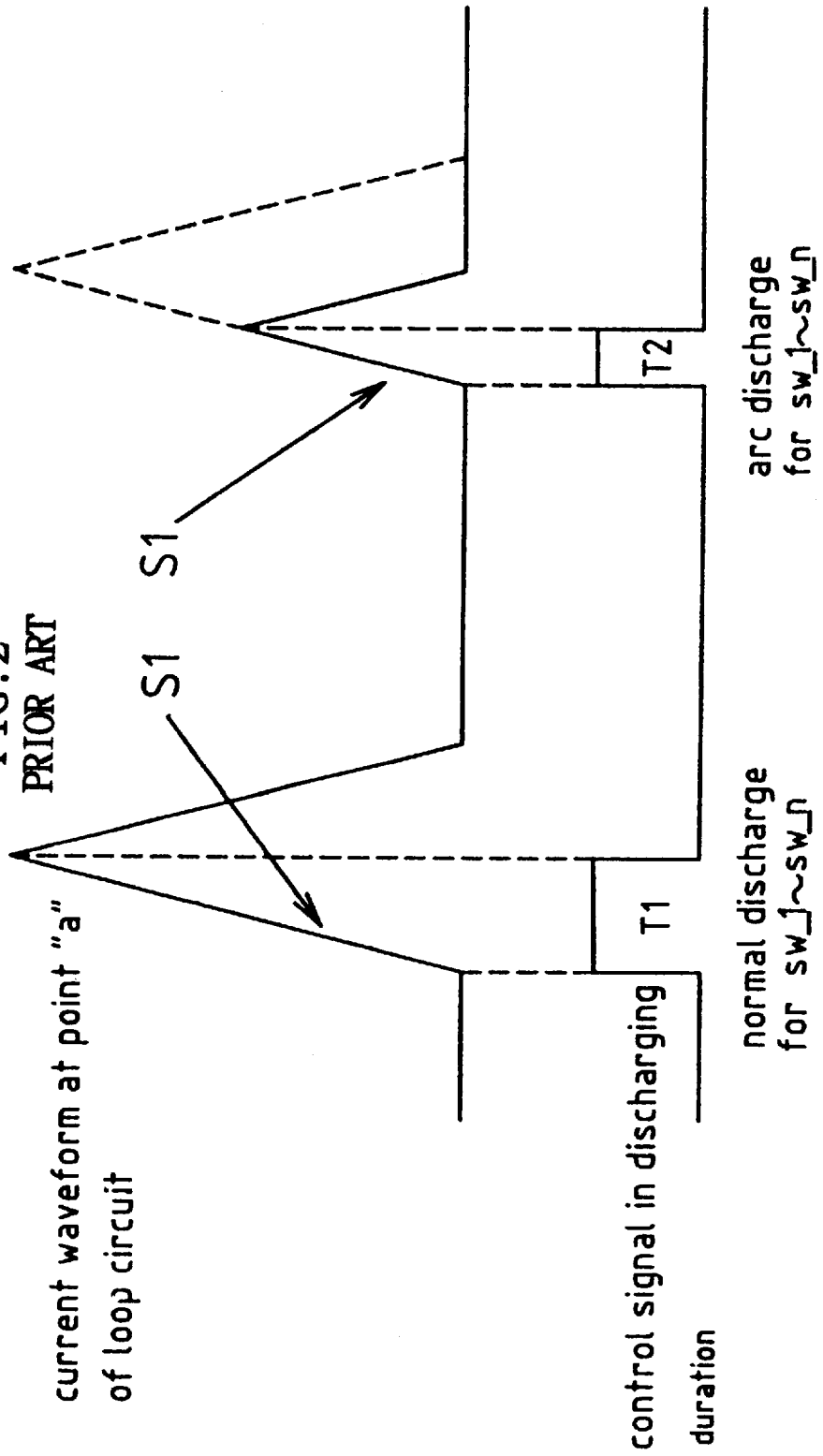
FIGS. 2 is a schematic diagram of discharging current waveform and controlling signal of a conventional constant slope wire cut EDM shown in FIG. 1.
Figure 3:
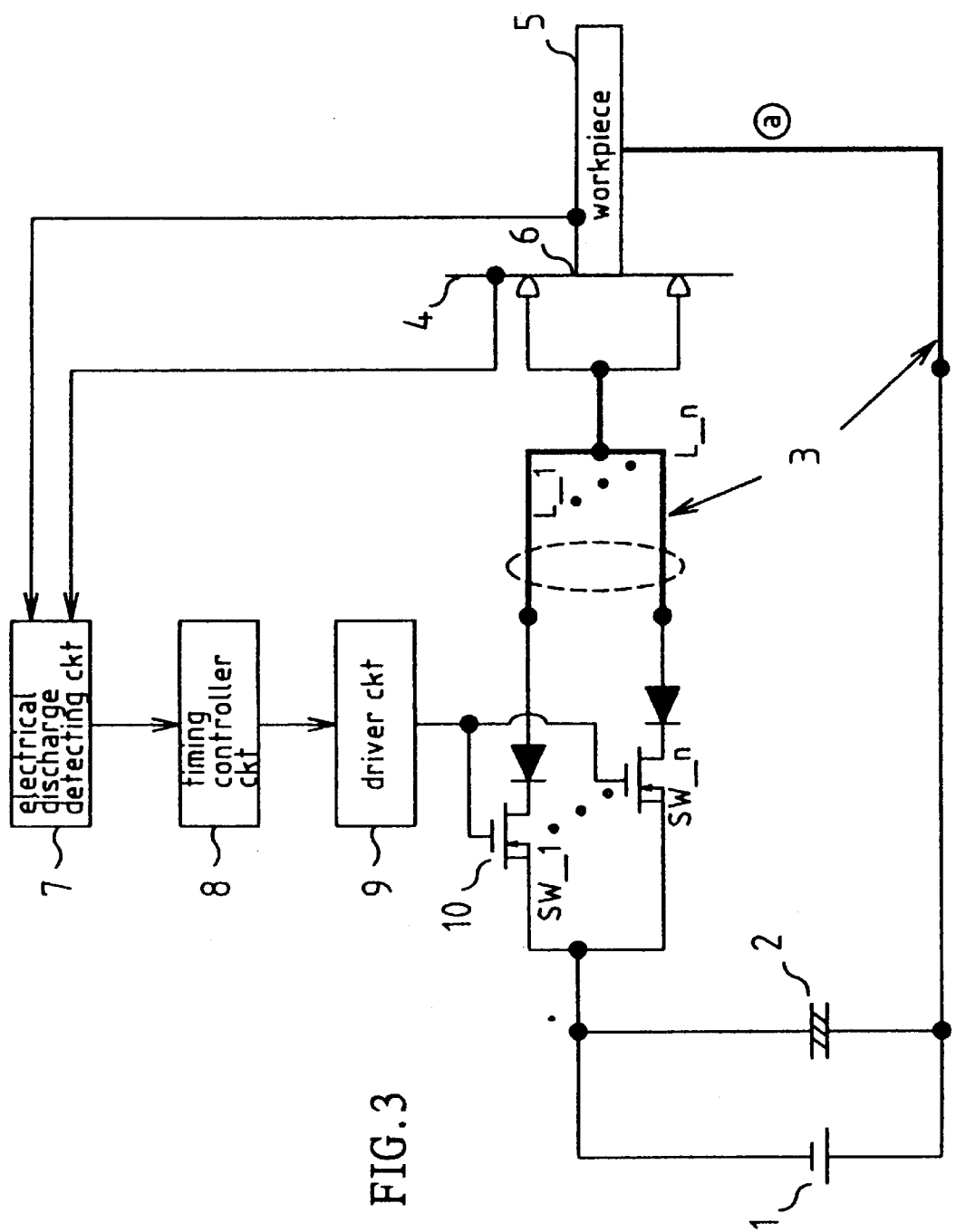
FIG. 3 is a schematic diagram of a discharge circuitry of wire cut EDM according to the present invention.

The schematic diagram of a discharge circuitry of wire cut EDM embodiment of the present invention is shown in FIG. 3, wherein the same number as designated in FIG. 1 representing similar components, and 9a designated a normal discharge driver circuit 9b designated an arc discharge driver circuit, SWN-1~SWN-n of 10a designated normal discharge switch elements and SWA-1~SWA-m of 10b designated arc discharge switch elements In the method and device for controlling discharging current slope of wire cut electrical discharge machine of the present invention, wherein the detecting discharging operation is to provide a detecting voltage between the wire electrode 4 and the workpiece 5, the electrical discharge detecting circuit 7 checks the detecting voltage between the wire electrode 4 and tile workpiece 5 alter a short period to see whether the detecting voltage is larger than a predetermined reference voltage or not; if the detecting voltage is larger than the reference voltage, it means there is a proper distance (gap) between the wire electrode 4 and the workpiece 5, so that it would be deemed as normal discharge next time; otherwise, if the detected voltage is smaller than the reference voltage, it means that the distance between the wire electrode 4 and the workpiece 5 is very small, and it would be deemed as arc discharge next time. The timing controller circuit 8 will produce the timing with different (or the same) duration of discharging in accordance with the determined normal discharge or arc discharge; it controls the normal discharge driver circuit 9a to output an amplified control signal during the normal discharge duration to control the normal discharge switch elements 10a (SWN-1~SWN-n) turning on, so as to output normal discharge energy between the wire electrode 4 and the workpiece 5; otherwise, it controls the arc discharge driver circuit 9b to output an amplified control signal during the arc discharge duration to control the arc discharge switch elements 10b (SWA-1~SWA-m) turning on, so as to output arc discharge energy between the wire electrode 4 and the workpiece 5. Because it controls the normal discharge switch elements 10a in this circuit to adapt the electrode wire circuit having a smaller inductance (in FIG. 3, the normal discharge-loop inductance is determined by parallel LN-1~LN-n), the discharge current slope is larger. On the other hand, as it controls the arc discharge switch elements 10b to adapt the electrode wire circuit having, a larger inductance (in FIG. 3, the arc discharge-loop inductance is determined by parallel LA-1~LA-m), hence the discharge current slope is smaller. Therefore the normal discharge switch elements 10a and the arc discharge switch elements 10b control the electrode wires corresponding to different inductance value respectively to adjust discharging current slope, to render the wire cut EDM maintaining a larger current slope in normal discharge state to promote the machining speed and a smaller current slope in arc discharge to prevent the wire electrode from breakage.

Figure 4:
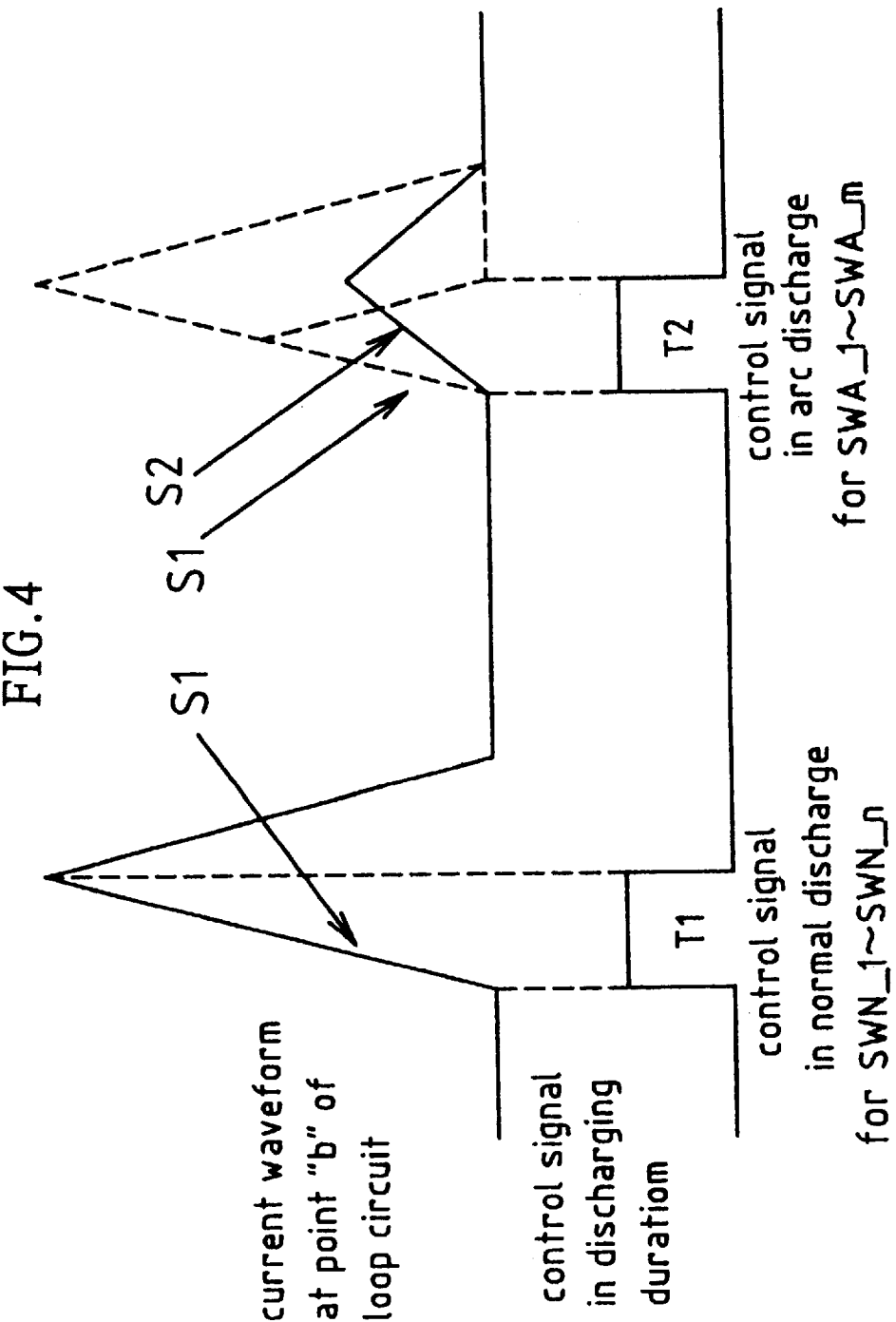
FIG. 4 is a schematic diagram of discharging current waveform and controlling signal of a variable slope wire cut EDM of the present invention shown in FIG. 3.

The discharging current signal waveform at point "b" of the circuitry of the embodiment in FIG. 3 is shown in FIG. 4, wherein T1 is the half cycle pulse width controlled by normal discharge and T2 is the half cycle pulse width controlled by arc discharge; generally $T1 \geq T2$ (in this case $T1=T2$); the slope of normal discharge current is S1 and the slope of arc discharge current is S2, and S1>S2. The provided energy ratio of normal discharge and arc discharge equals S1/S2, and the energy variance during, electrical discharge is linear so both high machining speed and the quality of machined workpiece can be main without easily breaking of the wire electrode of the wire cut EDM.

The controlling discharging current slope method and device of the wire cut EDM of the present invention provide a wire electrode circuit which matches different inductance of electrode wires respectedly for adjusting the slope of discharging current, to render the wire cut EDM maintaining a larger current slope in normal discharge condition to promote the machining speed, and a smaller current slope in arc discharge to prevent the wire electrode from breakage, so that the wire cut EDM can simultaneouly achieve the effects of keeping a high machining speed without easily breaking the wire electrode.

Although the present invention has been described and illustrated in detail, it is clearly understood that what disclosed is by way of illustration and example only and is not to be taken as limitation; the spirit and scope of the present invention is limited only by the appended claims.

What is claimed is:

1. A discharging current slope control method of a wire cut electrical discharge machine comprising the steps of:
   (a) applying a detecting voltage between a wire electrode and a workpiece using a discharging detecting circuit to predict whether a discharge will be normal discharge or arc discharge during next current discharge;
   (b) determining the discharging pulse width of normal discharge or arc discharge based on the result of said predicted discharging condition;
   (c) during a normal discharge duration, driving a set of normal discharge switching elements to send a discharging current between said wire electrode and said workpiece through a normal discharge circuit; and
   (d) during an arc discharge duration, driving a set of arc discharge switching elements to send a discharge current between said wire electrode and said workpiece through an arc discharge circuit;
   (e) wherein said discharge current sent out during said arc discharge duration has a smaller slope than said discharge current sent out during said normal discharge duration.

2. The discharging current slope control method of claim 1, wherein said normal discharge electrode circuit maintains a large discharging current slope during said normal discharge and said arc discharge circuit is provided with a small discharging current slope during said arc discharge.

3. The discharging current slope control method of claim 1, wherein the duration of arc discharge is not longer than the duration of normal discharge.

4. The discharging current slope control method of claim 3, wherein the controlling of the discharging current slopes is to cause said normal discharge circuit and said arc discharge circuit to have different loop inductances.

5. A discharging current slope control device for use in a wire cut electrical discharge machine comprising:
   a wire electrode;
   an electrical discharging detecting circuit for detecting and judging whether a discharge will be in a normal discharge or an arc discharge condition prior to sending out a discharging current;

a timing controlling circuit for controlling different timing based on the detected result of normal discharge or arc discharge by said electrical discharge detecting circuit; and a driver circuit for amplifying and sending the discharge timing control signal from said timing controlling circuit to drive switch elements; by combining said components of said wire cut electrical discharge machine, the slopes of the triangle waveform current output by the wire cut electrical discharge machine during normal or arc discharge shall depend on the results of discharge detection, wherein the current slope of arc discharge is smaller than that of normal discharge and high speed and stable machining is achieved without easily breaking of said wire electrode.

6. The discharging current slope control device of claim 5, wherein said driver circuit further comprises:

a normal discharge driver circuit for amplifying and sending a normal discharge timing control signal from said timing controlling circuit; and an arc discharge driver circuit for amplifying and sending an arc discharge timing control signal from said timing controlling circuit.

7. The discharge current slope control device of claim 6, wherein said switch elements further comprise:

normal discharge switch elements which are selectively turned on as receiving the amplifying timing controlling signal from said normal discharge driver circuit to control the discharging duration of said wire cut electrical discharge machine; and arc discharge switch elements which are selectively turned on as receiving the amplifying timing controlling signal from said arc discharge driver circuit to control the discharging duration of said wire cut electrical discharge machine.

8. A method for using a wire cut electrical discharge machine to fabricate an object comprising the steps of:

(a) providing a wire cut electrical discharge machine comprising:
(i) a wire electrode
(ii) an electrical discharging detecting circuit disposed between said wire electrode and an object for detecting and determining whether it will be in a normal discharge or an arc discharge condition prior to sending out a discharge current from a power source;
(iii) a timing control circuit connected to said discharging detecting circuit for controlling the pulse width of a discharging control signal sent out from said discharging detecting circuit, and amplifying and sending said discharging control signal to a normal discharge driver circuit or an arc discharge driver circuit, based the detected result from said discharging detecting circuit;
(iv) a normal drive switch circuit connected to said normal discharge driver circuit for controlling said discharge current to be sent to said wire electrode into a first triangular waveform with a first slope;
(v) an arc discharge drive switch circuit connected to said arc discharge driver circuit for controlling said discharge current to be sent to said wire electrode into a second triangular waveform with a second slope;
(vi) wherein said second slope is smaller than said first slope, so as to allow a faster machining speed during said normal discharge and prevent breakage of said wire electrode during said arc discharge;

(b) applying a detecting voltage between said wire electrode and said workpiece using said discharging detecting circuit to predict whether the discharge will be normal discharge or arc discharge during next current discharge;

(c) setting the pulse width of said discharging control signal and sending said discharging control signal to either said normal discharge driver circuit or said arc discharge driver circuit, based the detected result from said discharging detecting circuit;

(d) whereby said normal discharge driver circuit and said arc discharge driver circuit will cause said discharge current to assume a triangular waveform with a predetermined slope.

9. The method for using a wire cut electrical discharge machine to fabricate an object according to claim 8 wherein said slope of said discharge current is controlled by using different loop inductances in said normal discharge circuit and said arc discharge circuit.

* * * * *